(12) United States Patent
Palmer

(10) Patent No.: US 6,219,202 B1
(45) Date of Patent: Apr. 17, 2001

(54) SLIDER SUSPENSION ASSEMBLY AND METHOD FOR ATTACHING A SLIDER TO A SUSPENSION IN A DATA-RECORDING DISK FILE INCLUDING A FLEXIBLE INTEGRATED CABLE HAVING AN APERTURE THEREIN FOR PERMITTING ELECTRICAL CONTACT

(75) Inventor: Darrell D. Palmer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 08/548,938

(22) Filed: Oct. 26, 1995

(51) Int. Cl.[7] ........................................ G11B 5/60
(52) U.S. Cl. ........................................ 360/234.5
(58) Field of Search ........................ 360/104, 103, 360/105, 106, 234.5, 245.9

(56) References Cited

U.S. PATENT DOCUMENTS

| | | | |
|---|---|---|---|
| 4,761,699 | 8/1988 | Ainslie et al. | 360/103 |
| 4,789,914 | 12/1988 | Ainslie et al. | 360/103 |
| 4,792,875 | 12/1988 | Ohdaira | 360/104 |
| 4,796,132 | 1/1989 | Dekura et al. | 360/113 |
| 4,819,094 | 4/1989 | Oberg | 360/104 |
| 4,996,623 | 2/1991 | Erpelding et al. | 360/104 |
| 5,121,273 | 6/1992 | Slezak | 360/104 |
| 5,331,489 | 7/1994 | Johnson et al. | 360/104 |
| 5,557,488 | * 9/1996 | Hamilton et al. | 360/104 |

FOREIGN PATENT DOCUMENTS

| | | |
|---|---|---|
| 0412739 | 2/1991 | (EP) . |
| 2 193 833 | 2/1988 | (GB) . |
| 2193833 | 2/1988 | (GB) . |
| 2288055 | 10/1995 | (GB) . |
| 2295918 | 6/1996 | (GB) . |
| 61-16006 | 1/1986 | (JP) . |
| WO9637883 | 11/1996 | (WO) . |

* cited by examiner

Primary Examiner—Robert S. Tupper
Assistant Examiner—M. K. Watkins
(74) Attorney, Agent, or Firm—Douglas R. Millett; Felsman, Bradley, Vader, Gunter & Dillon, LLP

(57) ABSTRACT

A slider suspension assembly for a data-recording disk file is disclosed. The slider suspension assembly uses an improved mechanical and electrical attachment arrangement to attach the slider to the suspension. The slider suspension assembly utilizes a load beam having an integrated cable formed at least partially within the load beam along the length thereof wherein the integrated cable includes a dielectric layer and a plurality of conductors disposed upon the dielectric layer. A slider mounted to a flexure at the end of the load beam includes multiple conductive pads disposed along one edge thereof. A loop within the integrated cable of a radius sufficient to cause the integrated cable to overlie the selected edge of the slider is utilized to make electrical contact with the slider by providing an aperture within the dielectric layer of the cable at a point overlying the plurality of conductive pads such that the conductors within the integrated cable may be placed in electrical contact with the conductive pads.

20 Claims, 7 Drawing Sheets

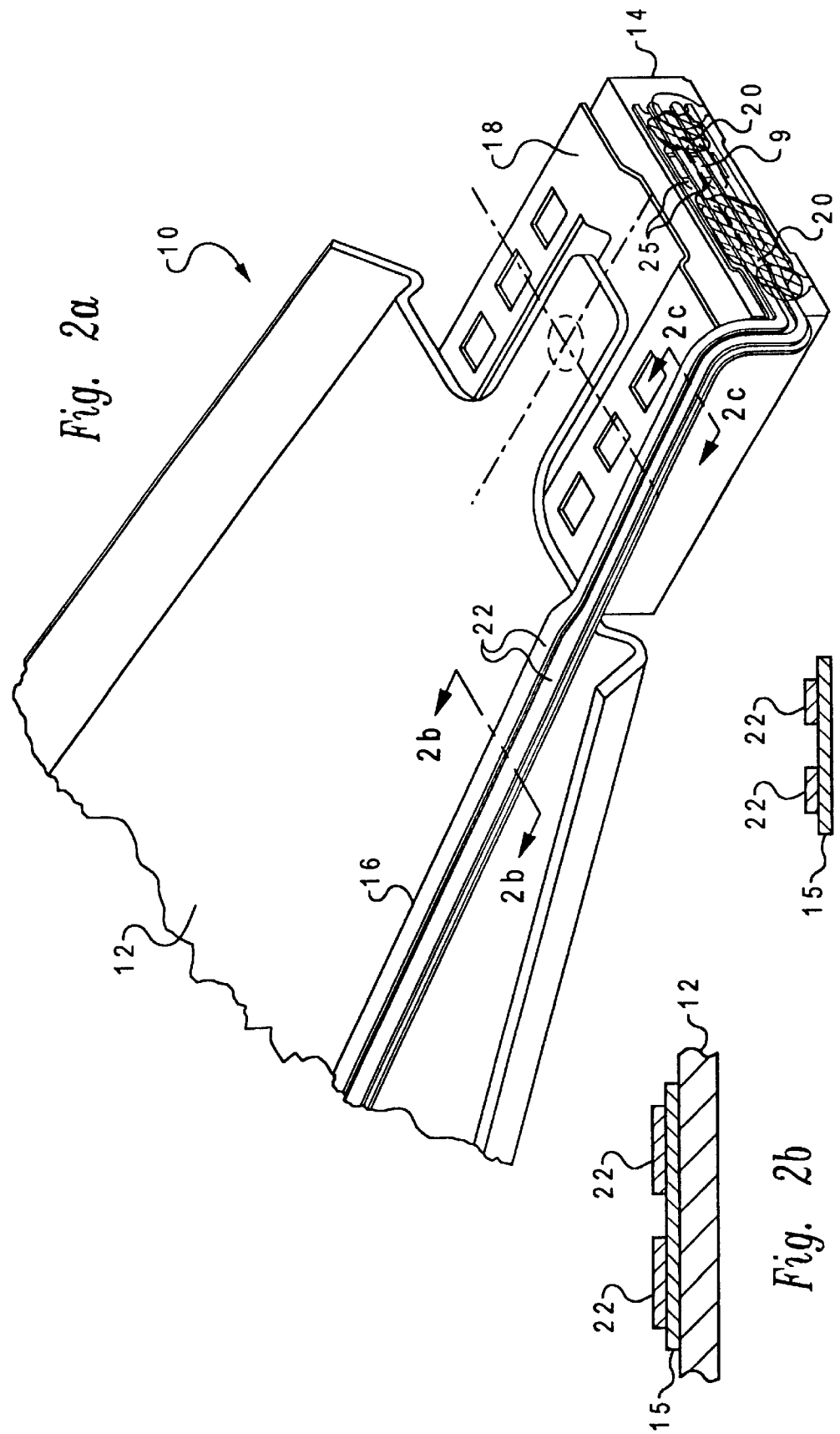

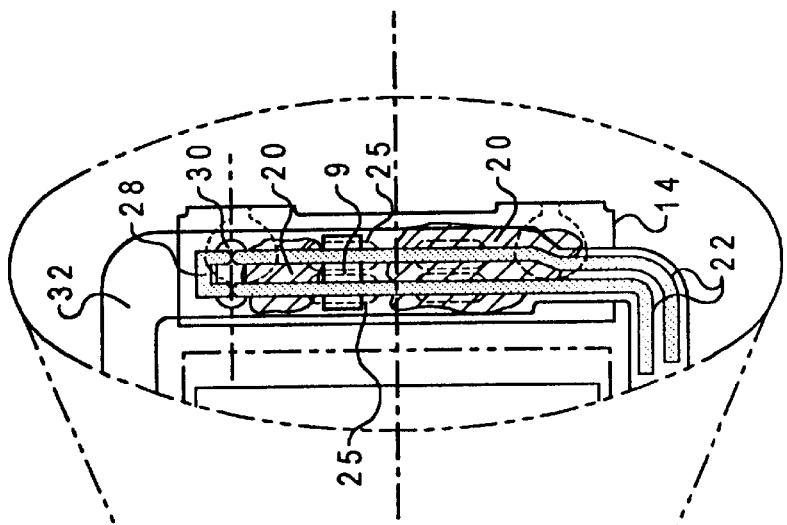
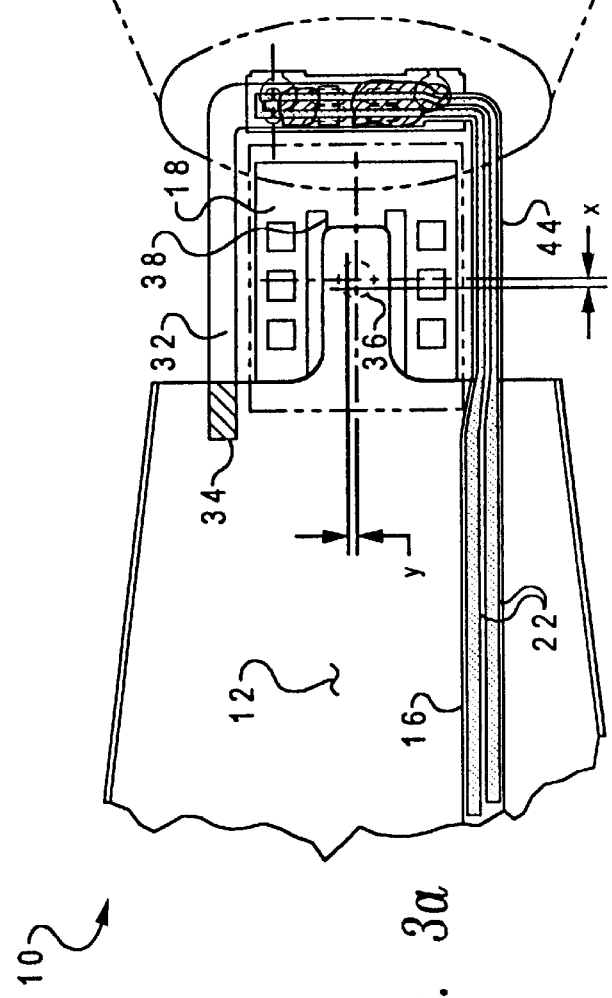
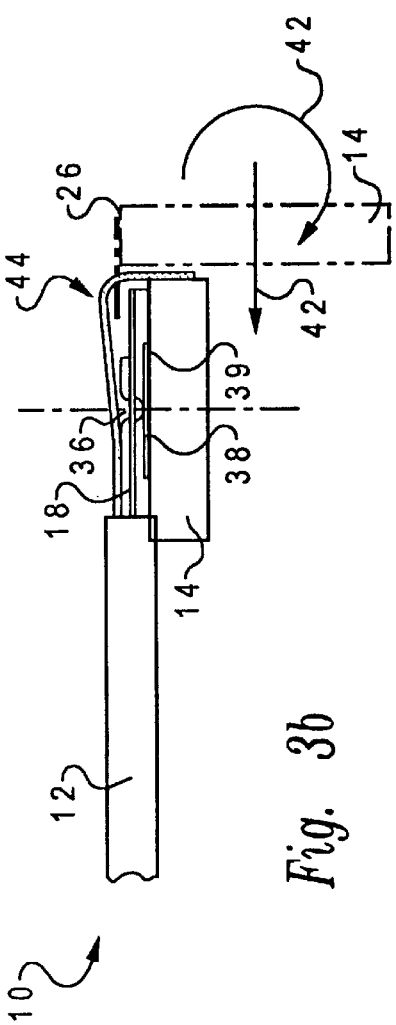
Fig. 3a
Fig. 3b

SLIDER SUSPENSION ASSEMBLY AND METHOD FOR ATTACHING A SLIDER TO A SUSPENSION IN A DATA-RECORDING DISK FILE INCLUDING A FLEXIBLE INTEGRATED CABLE HAVING AN APERTURE THEREIN FOR PERMITTING ELECTRICAL CONTACT

BACKGROUND OF THE INVENTION

1. Technical Field

This invention relates generally to a slider suspension assembly for a data-recording disk file and, more particularly, to an improved slider suspension assembly and to a method for mechanically and electronically attaching the slider to the suspension.

2. Description of the Related Art

Disk files are information storage devices that utilize at least one rotatable disk with concentric data tracks containing the information, a head (or "transducer") for reading data from or writing data to the various tracks, and a head-positioning actuator connected to the head for moving it to the desired track and maintaining it over the track center line during read or write operations. The transducer is attached to an air-bearing slider that is supported adjacent to the data surface of the disk by a cushion of air generated by the rotating disk.

The slider is connected to a support arm of the head-positioning actuator by means of a suspension. The suspension provides dimensional stability between the slider and actuator arm, controlled flexibility in pitch and roll motion of the slider relative to its direction of motion on the rotating disk, and resistance to yaw motion. In conventional disk files, the suspension provides a load or force against the slider that is compensated by the force of the air bearing between the slider's air-bearing surface and the disk surface. Thus, the slider is maintained in extremely close proximity to, but out of contact with, the data surface of the disk.

The suspension typically comprises a load beam, which is mounted at one end to the actuator arm, and a flexure element, which is attached to the other end of the load beam and supports the slider. The load beam provides the resilient spring action that biases the slider toward the surface of the disk, while the flexure provides flexibility for the slider as the slider rides on the cushion of air between the air-bearing surface and the rotating disk.

In the conventional slider suspension assembly, the slider is mechanically attached to the flexure element of the suspension by epoxy bonding. The electrical connection between the transducer and the disk file read/write electronics is made by discrete twisted wires that run the length of the suspension load beam and extend over the flexure and slider. The ends of the wires are soldered or ultrasonically bonded to the transducer termination pads on the slider. The fabrication of such a slider suspension in most cases requires manual assembly and is thus time-consuming and costly. It is this manual assembly and delicate operation of attaching the slider suspension assembly that leads to the largest portion of errors and failures of product during operation.

Accordingly, what is needed is an improved slider suspension assembly and method for making such assemblies. Moreover, what is needed is an improved method of attaching a slider head to a suspension element that is easy to perform, thus leading to being implemented in an automated process.

SUMMARY OF THE INVENTION

It is therefore one object of the present invention to provide a slider suspension assembly for a data-recording disk file.

It is another object of the present invention to provide an improved slider suspension assembly and a method for mechanically and electronically attaching the slider to the suspension.

According to the present invention, a head gimbal assembly for use in an information storage system is disclosed. The information storage system, which has a storage medium having a plurality of tracks for recording of data, includes a head gimbal that has a load beam, a slider, and a cable. The load beam further includes arm-electronics termination pads. The slider couples to the load beam and has a read and/or write transducer and electrical leads terminating at termination pads. The slider maintains a closely spaced position relative to the surface of the storage medium during relative movement between the storage medium and the slider. The cable is mechanically and electrically coupled to the slider and has etched integrated read and write conductors attached to the slider so as to provide a strain relief section.

The head gimbal further includes a flexure coupled to the load beam for connecting the slider to the load beam. The load beam and cable are etched from a laminated panel. The cable is strain relieved using epoxy and includes a loop. The slider is offset with respect to a gimbal pivot in order to compensate for bias forces exerted by the cable on the slider.

The foregoing objects are achieved as is now described.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2a is an isometric view of the current invention.

FIG. 2b is a section view of the suspension in FIG. 2A showing the construction of the integrated read/write cable in the load beam area.

FIG. 2c is a section view of the suspension in FIG. 2A showing the construction of the integrated read/write cable in the gimbal area.

FIG. 3a is a top view of the current invention illustrating the process for attaching and terminating the integrated read/write cable to the head and the head to the suspension flexure.

FIG. 3b is a side view of FIG. 3A.

DETAILED DESCRIPTION OF THE INVENTION

Figure 1A:
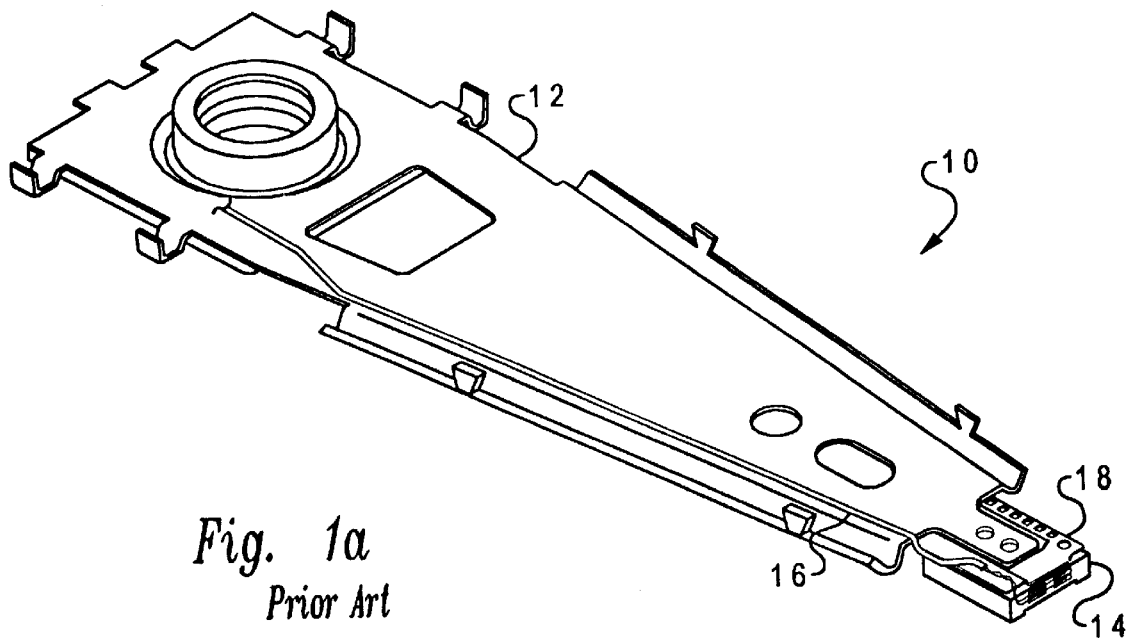
FIG. 1a depicts an isometric view of a prior art Hutchison Type 1900 series head gimbal assembly (HGA) with a discrete, twisted wire cable bonded to the head termination pads.
Figure 1B:
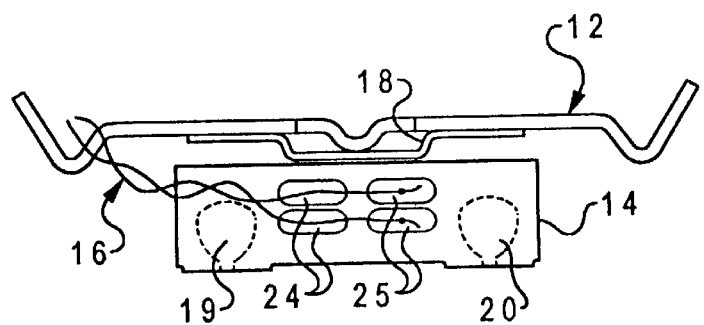
FIG. 1b is an end view of the suspension in FIG. 1A.

Referring first to FIG. 1a, there are four major components of the slider suspension assembly 10. First is the suspension load beam element 12, which is connected at its end to a flexure 18, which is mechanically connected to a slider 14, which is electrically connected via a discrete twisted wire cable 16. Slider 14 may be, for example, a conventional thin-film inductive head having dual read/write elements 19 and 20, and horizontal termination studs 24 and 25, which are all depicted more clearly in FIG. 1b.

Suspension for load beam 12 is a Hutchinson-type 1900 Series HGA (head gimbal assembly), which is widely used in the hard-disk drive (HDD) industry. Other types of load beams may be freely substituted for the one illustrated in FIG. 1a, and is used merely for illustrative purposes.

FIG. 2a is an isometric view of the current invention. The load beam 12 in FIG. 2a is similar in shape to the load beam 12 in FIG. 1a, except that it is fabricated from a laminated material such as described in commonly assigned U.S. patent application Ser. No. 08/270,928, filed Jul. 5, 1994, incorporated by reference herein for all purposes. The integrated cable 16 and load beam 12 in FIG. 2a are formed by selectively etching or patterning the copper, dielectric, and steel layers of the laminated material, or both. FIG. 2b is a section view of the cable 16 taken at a typical location on the load beam 12 showing that the cable conductors 22 are electrically isolated from the load beam 12 by the dielectric layer 15, thereby preventing the conductors 22 from shorting to the load beam 12. FIG. 2c is a section view of the cable 16 taken in the gimbal or flexure area of the suspension showing that the load beam layer in this area is removed to allow the conductors 22 and the dielectric 15 to flex freely with the gimbal flexure 18.

FIG. 2a is also a closeup view of the slider 14 and cable 16. Slider 14 attaches to load beam 12 via a flexure 18. Cable 16 connects to slider 14 via epoxy bumps 20, which also serve as a strain relief for conductors 22 on cable 16. Conductors 22 extend across head termination pads 24 (FIG. 1b) on slider 14 and are exposed to pads 25 through an opening 9 in the dielectric layer 15 of cable 16. The dielectric layer 15, being on the side of cable 16 closest to the load beam 12 and slider 14, insulates conductors 22 from load beam 12 and slider 14, thereby preventing the two conductors 22 from shorting together.

Figure 4A:
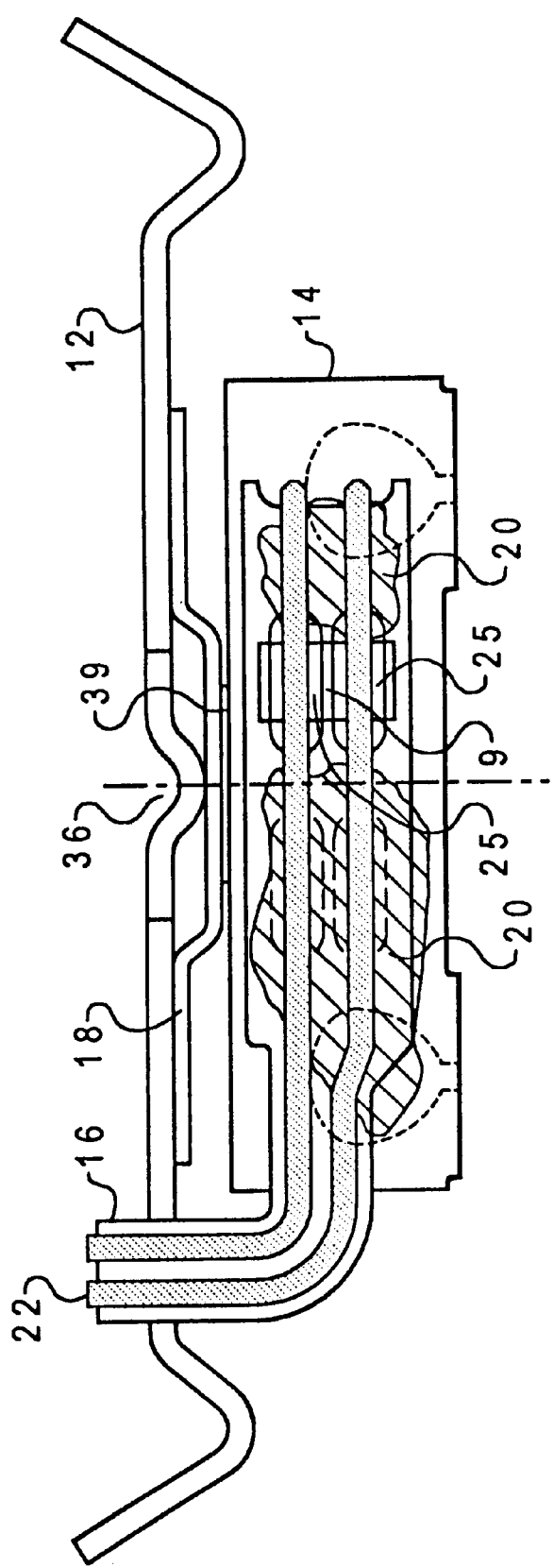
FIG. 4a is an end view of the HGA shown in FIGS. 2 and 3.

FIGS. 3a, 3b, and 4A are top, side, and end views, respectively, of the suspension in FIG. 2 and illustrate the process for attaching the cable 16 to the slider 14, terminating the conductors 22 to the slider termination pads 26, and attaching the slider 14 to the flexure 18. FIG. 3a also shows a cable loop 32 which contains an ESD shunt 28. The shunt 28 is used to protect the slider traducer from ESD damage during the assembly process. Both the shunt 28 and cable loop 32 are removed at a later point in the assembly process as explained below.

Slider 14 and load beam 12 are positioned with fixtures as shown in FIG. 3A and 3B. Slider 14 is oriented 90° with respect to load beam 12. Cable 16 is held up by fixturing while strain-relief epoxy 20 is dispensed to the face of slider 14. Cable 16 is then allowed to mate with slider 14 so that conductors 22 can be bonded ultrasonically to termination 25 through the opening 9 in the dielectric layer 15. Quick-tack epoxy is used so that slider 14 is held in place quickly when attached to cable 16. Slider 14, or load beam 12, is rotated as indicated by arrows 42 to form a loop 44 in cable 16. The slider 14 is then mechanically bonded to the flexure mount surface 38 with epoxy 39. Loop 32 and ESD shunt 28 are then separated from cable 16 at notches 30 and peeled away from load beam 12 at point 34. The center of slider 14 can be offset with respect to load beam dimple 36 by amounts X and Y as needed to compensate for gimbal-bias forces created by cable flex loop 44.

Figure 4B:
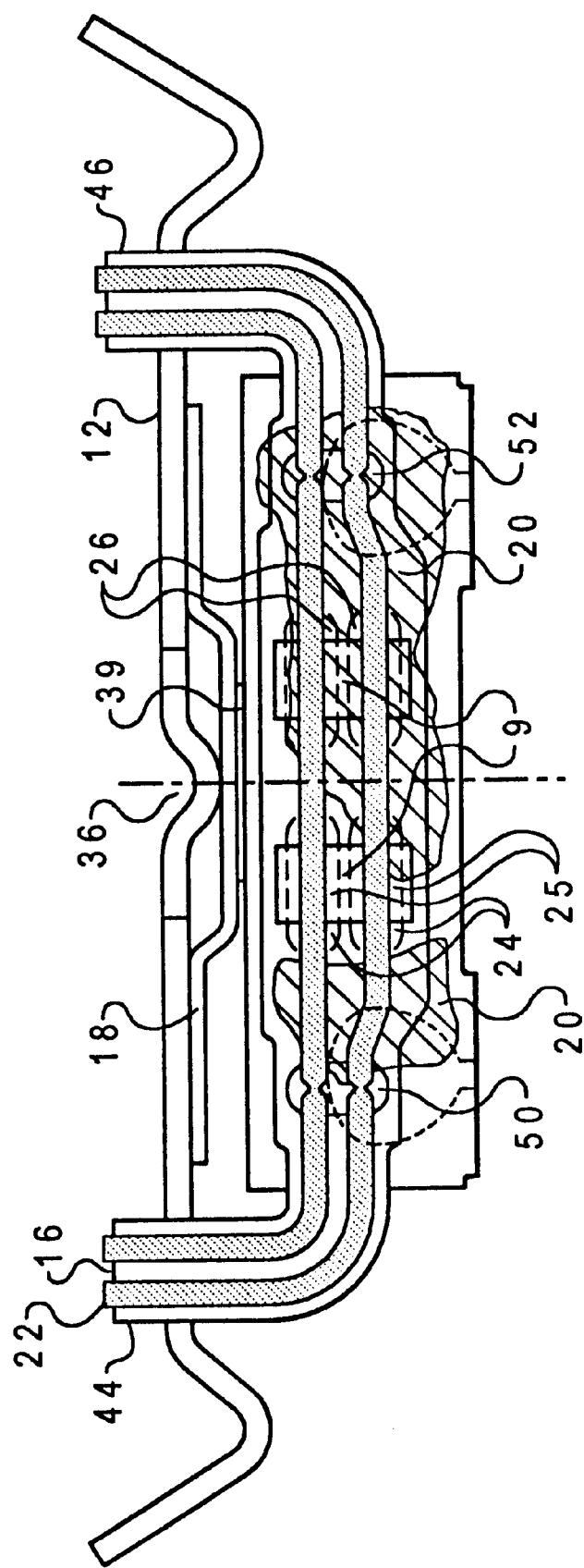
FIG. 4b is an alternate embodiment of the current invention showing a symmetric design that can be used for both "up" and "down" suspensions.

FIG. 4b illustrates an alternative embodiment for inductive sliders 14 where cable 16 has two notched areas 50 and 52; the remaining numbers are identical to those previously described and associated in FIGS. 2–3, and 4a, except there are two dielectric openings 9, and two cable loops 44 and 46. In this example, the load beam 12 and cable 16 are symmetrical so the same assembly can be used with both "up" and "down" sliders. For an "up" facing slider, wires 22 are terminated to the left set of slider pads 25, and cable loop 44 is removed by breaking it loose at notch 50. For a "down" facing slider, wires 22 are terminated to the right set of slider pads 26, and cable loop 46 is removed by breaking it loose at notch 52. In both cases, the unused set of termination pads are insulated from cable leads 22 in the region of opening 9 by epoxy 20.

Figure 4C:
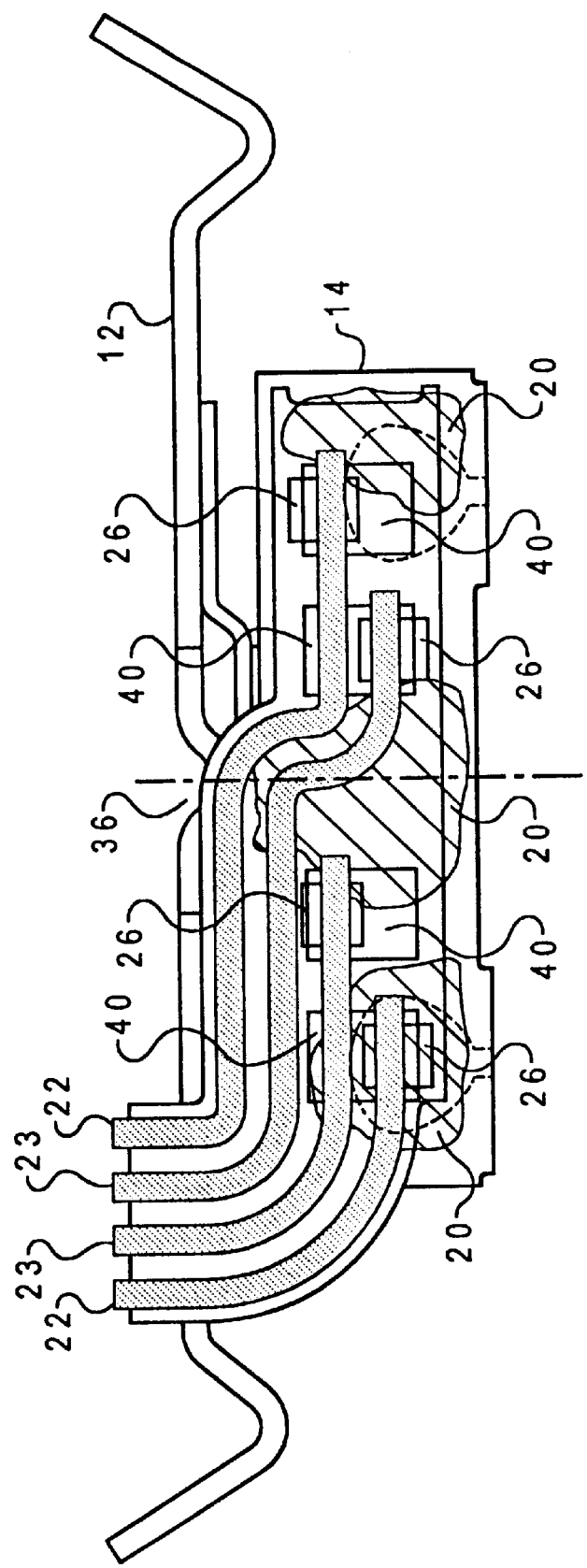
FIG. 4c is still another embodiment that can be used for applications requiring thin film magneto-restrictive (MR) heads with vertical termination pads.

FIG. 4c illustrates yet another embodiment for use with a particular type of floater head, such as, for example, an IBM MR head 14 using vertical studs 40. In this case, four cable leads 22 and 23 are accommodated. Termination to the four slider studs or pads 40 is done by ultrasonic bonding through four dielectric openings 26 which are smaller in size and staggered with respect to each other so that leads 22 can cross over adjacent slider pads without shorting to the pads. The actual process for attachment and termination of MR head 14 is identical to that described above for inductive slider 14 in FIG. 2. Further, the two read lines 23 are inside the two write lines 22 so that the latter serve as a noise shield during the read operation. A symmetrical version similar to FIG. 4b is also possible for the embodiment of 4c.

Figure 5:
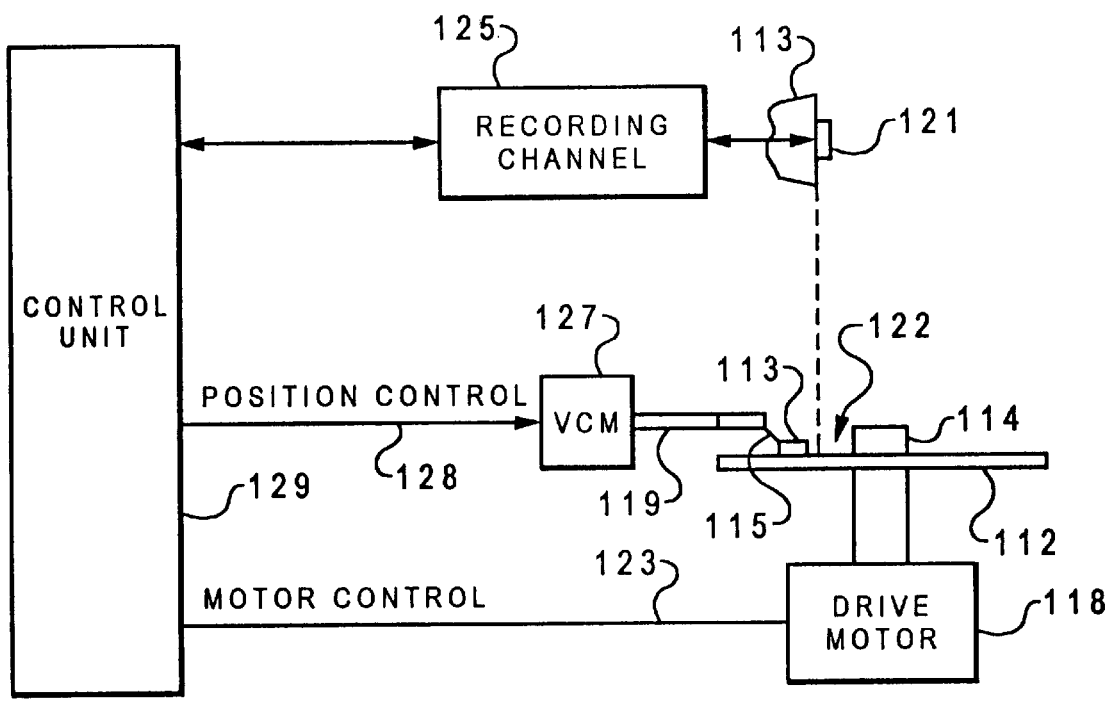
FIG. 5 depicts a magnetic disk storage system in accordance with the preferred embodiment of the present invention.

Although the present invention is described as embodied in the magnetic disk storage system as shown in FIG. 5, it will be apparent that the invention is also applicable to other magnetic recording systems such as a magnetic tape recording system, for example. Referring now to the figures, and in particular to FIG. 5, at least one rotatable magnetic disk 112 is supported on a spindle 114 and rotated by a disk drive motor 118. The magnetic recording media on each disk is in the form of an annular pattern of concentric data tracks (not shown) on disk 112.

At least one slider 113 is positioned on the disk 112, each slider 113 supporting one or more magnetic read/write heads 121. As disk 112 rotates, the sliders 113 are moved radially in and out so that the heads 121 may access different portions of the disk surface 122 containing the data. Each slider 113 is attached to a load beam or actuator arm 119 by means of a suspension 115. The suspension 115 provides a slight spring force which biases the slider 113 against the disk surface 122. Each actuator arm 119 is attached to an actuator means 127. The actuator means shown in FIG. 5 is a voice coil motor (VCM). The VCM is a coil movable within a fixed magnetic field, and the direction and velocity of the coil movements is controlled by the current supply. During operation of the disk storage system, the rotation of disk 112 generates an air bearing between slider 113 and the disk surface 122. The air bearing thus counterbalances the slight spring force of the suspension 115 and supports the slider 113 off the disk surface by small, substantially constant spacing during operation. The surface of heads 121 in contact with the air bearing is commonly known as the air bearing surface (ABS).

The various components of the disk storage system are controlled in operation by signals generated by control unit 129, such as access control signals and internal clock signals, and which includes logic control circuits, storage means and a microprocessor. The control unit 129 generates control signals to control various system operations such as motor control signals on line 123 and head position control signals on line 128. The control signals on line 128 provide the desired current profiles to optimally move and position a selected slider 113 to the desired data track on the associated disk 112. Read and write signals are communicated to and from read/write heads 121 by means of recording channel 125.

The above description of a typical magnetic disk storage system and the accompanying illustration of it in FIG. 5 are for representation purposes only. It should be apparent that disk storage systems may contain a large number of disks and actuators, and each actuator may support a number of sliders.

The improved suspension and attachment structure further provides a means for adapting laminated suspension technology and integrated read/write cable technology to many of the popular suspension load beam designs in use today as well as a means for terminating the integrated cable to either thin-film, inductive or thin-film magneto-restrictive heads. Other applications will be evident to those skilled in the art based upon the applications thus disclosed; therefore, the scope of the invention is not to be limited by the specification, but only by the claims.

What is claimed is:

1. A head gimbal assembly comprising:

a load beam;

a flexure coupled to said load beam;

an integrated cable formed at least partially within said load beam along the length thereof, said integrated cable having a dielectric layer and a plurality of conductors disposed upon said dielectric layer;

a slider mounted to said flexure having a plurality of conductive pads disposed along a selected edge thereof;

a loop within said integrated cable of a radius sufficient to cause said integrated cable to overlie said selected edge of said slider; and at least one aperture within said dielectric layer within said loop of said integrated cable overlying said plurality of conductive pads such that said plurality of conductors are in electrical contact with said plurality of conductive pads.

2. The head gimbal assembly according to claim 1 wherein said plurality of conductors are ultrasonically bonded to said plurality of conductive pads.

3. The head gimbal assembly according to claim 1 wherein said plurality of conductors are terminated to said plurality of conductive pads by laser solder reflow.

4. The head gimbal assembly according to claim 1 wherein said slider is offset with respect to a gimbal pivot point within said flexure in order to compensate for bias forces exerted by said integrated cable upon said slider.

5. The head gimbal assembly according to claim 1 wherein said integrated cable is symmetric with respect to a longitudinal axis of said load beam.

6. The head gimbal assembly according to claim 1 wherein said slider is a thin-film inductive head.

7. The head gimbal assembly according to claim 1 wherein said slider is a thin-film MR head.

8. The head gimbal assembly according to claim 1 wherein said plurality of conductors within said integrated cable comprises a pair of read lines nested inside a pair of write lines so that said write lines act as a noise shield during a read operation.

9. The head gimbal assembly according to claim 8 wherein said outside write lines are grounded during the read operation so as to enhance electrical shielding.

10. The head gimbal assembly according to claim 8 wherein said plurality of conductors are shunted together near said plurality of conductive pads for added electrostatic discharge protection during the assembly process.

11. An information storage system comprising:

a storage medium having a plurality of tracks for recording of data;

a load beam having arm-electronic termination pads;

a flexure coupled to said load beam;

an integrated cable formed at least partially within said load beam along the length thereof, said integrated cable having a dielectric layer and a plurality of conductors disposed upon said dielectric layer;

a slider mounted to said flexure having a plurality of conductive pads disposed along a selected edge thereof;

a loop within said integrated cable of a radius sufficient to cause said integrated cable to overlie said selected edge of said slider; and at least one aperture within said dielectric layer within said loop of said integrated cable overlying said plurality of conductive pads such that said plurality of conductors are in electrical contact with said plurality of conductive pads.

12. The information storage system according to claim 11 wherein said plurality of conductors are ultrasonically bonded to said plurality of conductive pads.

13. The information storage system according to claim 11 wherein said plurality of conductors are terminated to said plurality of conductive pads by laser solder reflow.

14. The information storage system according to claim 11 wherein said slider is offset with respect to a gimbal pivot point within said flexure in order to compensate for bias forces exerted by said integrated cable upon said slider.

15. The information storage system according to claim 11 wherein said integrated cable is symmetric with respect to a longitudinal axis of said load beam.

16. The information storage system according to claim 11 wherein said slider is a thin-film inductive head.

17. The information storage system according to claim 11 wherein said slider is a thin-film MR head.

18. The information storage system according to claim 11 wherein said plurality of conductors within said integrated cable comprises a pair of read lines nested inside a pair of write lines so that said write lines act as a noise shield during a read operation.

19. The information storage system according to claim 18 wherein said outside write lines are grounded during the read operation so as to enhance electrical shielding.

20. The information storage system according to claim 18 wherein said plurality of conductors are shunted together near said plurality of conductive pads for added electrostatic discharge protection during the assembly process.

* * * * *